United States Patent [19]

Wilson

[11] Patent Number: 4,801,153
[45] Date of Patent: Jan. 31, 1989

[54] PONTOON TRAILER

[75] Inventor: Parks B. Wilson, Marcellus, Mich.

[73] Assignee: World Pride Welding, Inc., Marcellus, Mich.

[21] Appl. No.: 40,072

[22] Filed: Apr. 20, 1987

[51] Int. Cl.$^4$ ............................................. B60P 3/10
[52] U.S. Cl. ................................ 280/414.1; 414/483; 414/536
[58] Field of Search .................. 280/414.1, 414.3, 656; 114/344; 414/480, 482, 483, 500, 529, 536

[56] References Cited

U.S. PATENT DOCUMENTS

| | | | |
|---|---|---|---|
| 2,628,733 | 2/1953 | Hale | 280/414.1 X |
| 2,754,017 | 7/1956 | Hart et al. | 414/483 |
| 2,765,942 | 10/1956 | Niemeier | 414/483 |
| 2,795,345 | 6/1957 | Crandall | 414/483 |
| 3,039,629 | 6/1962 | Cole | 414/532 |
| 3,069,038 | 12/1962 | Ahlbin | 414/483 |
| 3,097,755 | 7/1963 | Fulcher | 280/414.1 X |
| 3,102,649 | 9/1961 | Whalen | 414/483 |
| 3,595,598 | 7/1971 | Nuzum | 280/414.1 X |
| 3,974,924 | 8/1976 | Ullman, Jr. | 414/531 |
| 3,993,324 | 11/1976 | Carrick | 280/414.1 |
| 4,099,279 | 7/1978 | Park | 414/482 X |
| 4,103,925 | 8/1978 | Palamara | 280/414.1 |
| 4,109,809 | 8/1978 | Clark | 414/480 |
| 4,136,791 | 1/1979 | Clark | 414/480 |
| 4,138,135 | 2/1979 | Hewitt | 280/414.1 |
| 4,243,242 | 1/1981 | Waits | 280/414.1 |
| 4,519,738 | 5/1985 | Wood | 280/414.1 X |

FOREIGN PATENT DOCUMENTS

| | | | |
|---|---|---|---|
| 613439 | 1/1961 | Canada. | |
| 2444588 | 8/1980 | France | 414/483 |
| 2573015 | 5/1986 | France | 280/414.1 |
| 668600 | 10/1964 | Italy | 280/414.1 |

OTHER PUBLICATIONS

Alcort, Inc. Advertisement, Feb. 1956, "Tip-Top Boat Trailers".
Cover Page and p. 43 of Parts & Accessories Catalog No. 480F.

Primary Examiner—David M. Mitchell
Assistant Examiner—Charles R. Watts
Attorney, Agent, or Firm—Price, Heneveld, Cooper, DeWitt & Litton

[57] ABSTRACT

A trailer for a pontoon boat or other multiple-hull water craft has a pair of V-shaped glide members positioned for supporting the pontoons along substantially their entire length. The glide members are covered with a fabric, such as carpet, and are provided with a plurality of rollers in the bight of the V to provide superior support and to assist in loading and unloading a craft. The glides and frame beneath are articulated so that a rear trailer portion may be pivoted to assist in loading and unloading a craft. The trailer wheels are located laterally beyond the glides to provide exceptional load stability.

27 Claims, 3 Drawing Sheets

PONTOON TRAILER

BACKGROUND OF THE INVENTION

This invention relates to trailers for hauling watercraft and in particular to such trailers of the type that are capable of hauling multiple-hull watercraft.

Multiple-hull watercraft, such as pontoons and catamarans, have achieved great popularity. However, the structure of such craft, wherein multiple hulls are interconnected by a platform member, creates a relatively weak structure that is easily damaged, is difficult to load onto, and unload from, a trailer and to transport any long distances.

One form of trailer that has been developed for transporting pontoon craft has multiple support means acting on the center platform portion of the craft, wherein the pontoons hang free in space. Such a trailer provides undue stress on the pontoon mountings which can be damaged, especially during transportation for a long distance. In addition, loading and unloading of the craft is very difficult.

Another prior art trailer for a multiple-hull craft is shown in U.S. Pat. No. 4,243,242 issued to Gregory D. Waits. In the Waits' trailer, a pair of cradle assemblies 92 are pivotally mounted to a trailer and can be moved outwardly to support the hulls of a multiple-hull craft. While such a trailer partially avoids the support problem previously mentioned, the loading and unloading of the craft would still pose a difficulty. In addition, the narrow wheel span of the trailer with respect to the width of the craft, may provide a relatively unstable load.

Another attempt to trailer a multiple-hull boat is disclosed in Italian Pat. No. 668600 issued to Paolo Fadigati. The Fadigati trailer contemplates moving the hulls of a multiple-hull boat closer toward the span of the trailer wheels. While such a device would provide a more stable load it requires that the platform be separated from the hulls during transport which is arduous and, in the case of a pontoon craft, would be unsuitable for hauling the large platform. In addition, the trailer does not provide means to alleviate the difficulty of loading and unloading the craft.

SUMMARY OF THE INVENTION

It is, accordingly, an object of this invention to provide a trailer for a multiple-hull watercraft that will prevent damage to the craft even over long distance hauls. It is a further object of the invention to provide such a trailer that will be stable on the road. It is yet a further object of the invention to provide such a trailer having means to facilitate loading and unloading of a multiple-hull craft.

A trailer according to the present invention has a pair of V-shape glide members positioned for supporting a pontoon craft along substantially the entire length of each pontoon. The glides are covered with a fabric and a plurality of rollers are provided in the bight of each V to assist in loading and unloading the craft and in supporting the pontoons during transport. The glides are each divided into a front and rear section and the trailer frame is articulated beneath the location of the breakpoints in the glides to divide the trailer into a front and rear portion. The rear portion is pivoted with respect to the front portion to assist in loading and unloading the craft without disassembly thereof. The particular arrangement of the glides and the articulated frame additionally facilitates the trailer being used as a generaly utility vehicle when not being used as a pontoon trailer. Specifically, the glides are spaced apart substantially the full width of the frame, providing a substantial free space in between, for positioning a platform, etc. Further, the joint in the frame is positioned closer to the wheel axle than to the trailer tongue. This allows the rear portion to pivot to an unloading position eliminating the need for a separate ramp while preventing disruption to the horizontal orientation of the front portion. In addition, to provide a more stable load on the highway, the trailer wheels are located outwardly of the pontoon supporting glides.

These and other related objects, advantages and features of this invention will become apparent upon review of the following specification in conjunction with the drawings.

DESCRIPTION OF THE PREFERRED EMBODIMENT

Figure 2:
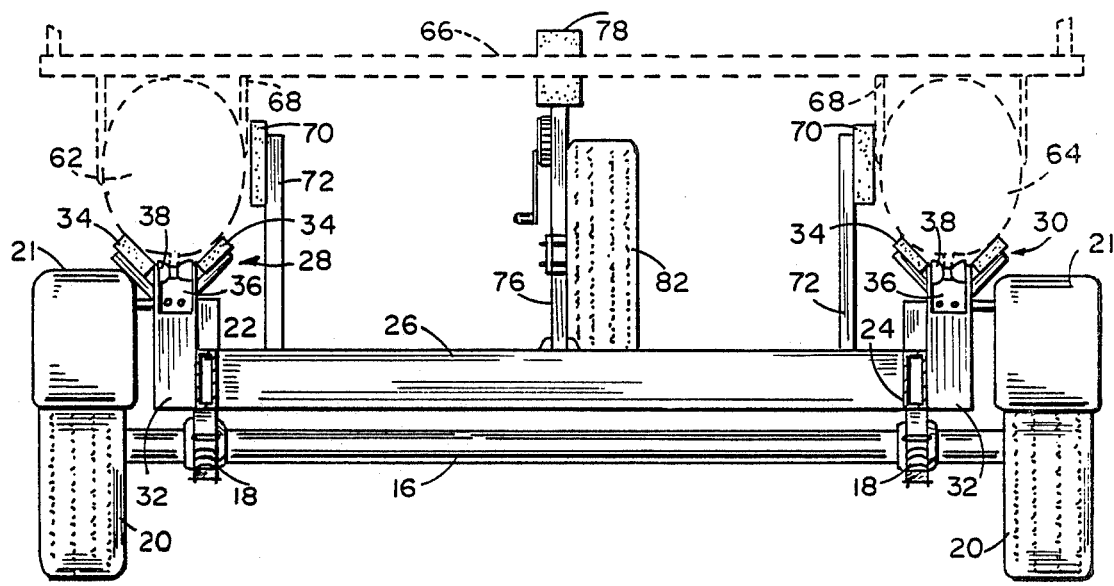
FIG. 2 is a sectional rear elevational view along the lines II—II of FIG. 1.

Referring now specifically to the drawings, and the illustrative embodiments depicted therein, a pontoon boat trailer generally shown at 10 has a generally planar frame 12 that is supported in the front by a tongue 14 and towards the rear by an axle 16 (FIG. 2). A pair of springs 18 provide a cushion between the axle and the frame. A pair of wheels 20 support the frame in contact with the road. Fenders 21 deflect mud and other debris spun off wheels 20.

Frame 12 is substantially constructed from welded box-shaped steel beams and has three laterally spaced side members 22, 23 and 24 that are rigidly interconnected by a plurality of laterally extending cross members 26. A pair of glides 28 and 30 extend substantially the entire length of the trailer and are spaced bove side members 22, 24. Glides are supported by a plurality of studs 32 attached to side members 22, 24.

Glides 28, 30 are formed of a pair of pad members 34 that are arranged in a general V-shape and are rigidly supported and attached to studs 32 by brackets 36. Brackets 36 are bolted to studs 32 and may be laterally adjustable therewith to accommodate various width craft. A roller 38 is rotatably mounted on each bracket 36 within the bight of glides 28, 30. Rollers 38 are constructed of wood and pads 34 are covered by a fibrous material, which is carpet in the illustrated embodiment, to prevent damage to the pontoons.

Figure 6A:
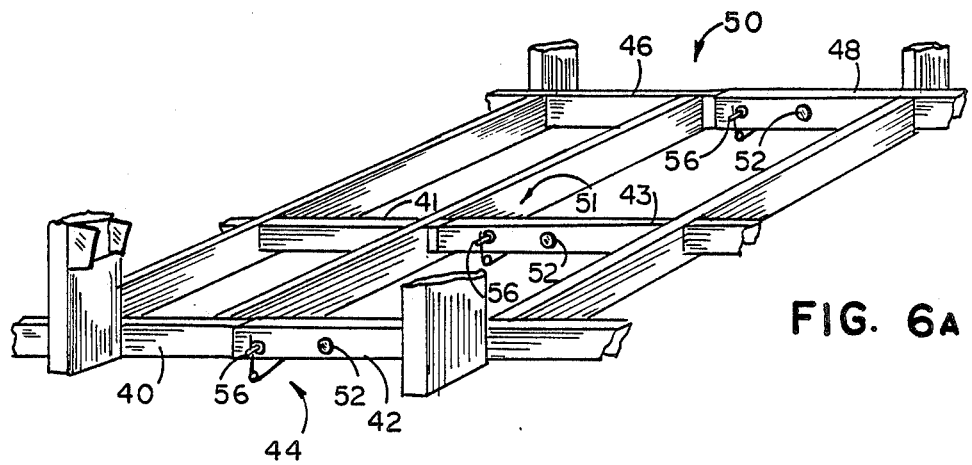
FIG. 6 is an enlargement of the joint in the trailer frame.
Figure 6B:
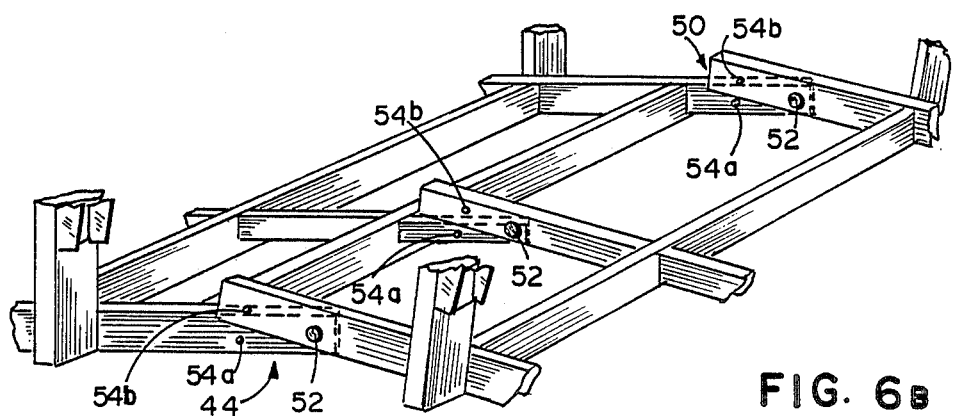

Side member 22 is divided into a pair of longitudinal members 40 and 42 by a joint member generally shown at 44. Likewise, side member 24 is divided into a pair of longitudinal members 46, 48 by a joint generally shown at 50 and side member 23 is divided into a pair of longitudinal members 41, 43 by a joint generally shown at 51. As best seen in FIG. 6, the front portion of each rear longitudinal member 42, 43, 48 is generally channel-shaped and overlies the rearmost portion of the respective front longitudinal member. Front longitudinal members 40, 41, 46 are rotatably connected to rear longitudinal members 42, 43, 48, respectively by bolts 52, extending therethrough. Pins 56 extending through alignable apertures 54a, 54b, retain the respective front and rear longitudinal members in aligned relationship. However, with pins 56 removed, the front and rear members can be pivoted with respect to each other about bolts 52.

The provision of three joints 44, 50, and 51 gives added strength to the trailer frame and serves to divide the trailer 10 into a front section 58 and a rear section 60.

Referring to FIG. 2, a representative pontoon craft is shown having pontoons 62 and 64 attached to a deck 66 by mounting means 68. The pontoons are supported on trailer 10 by glides 28, 30 at three circumferentially spaced points each, viewing each pontoon in cross section. Two of the points are supported by pad members 34 and an intermediate point by roller 38. A plurality of optional, removable lateral support members 70 are removably attached to cross members 26 by a brace 72. When used, support members 70 provide a fourth support point for each pontoon.

Figure 1:
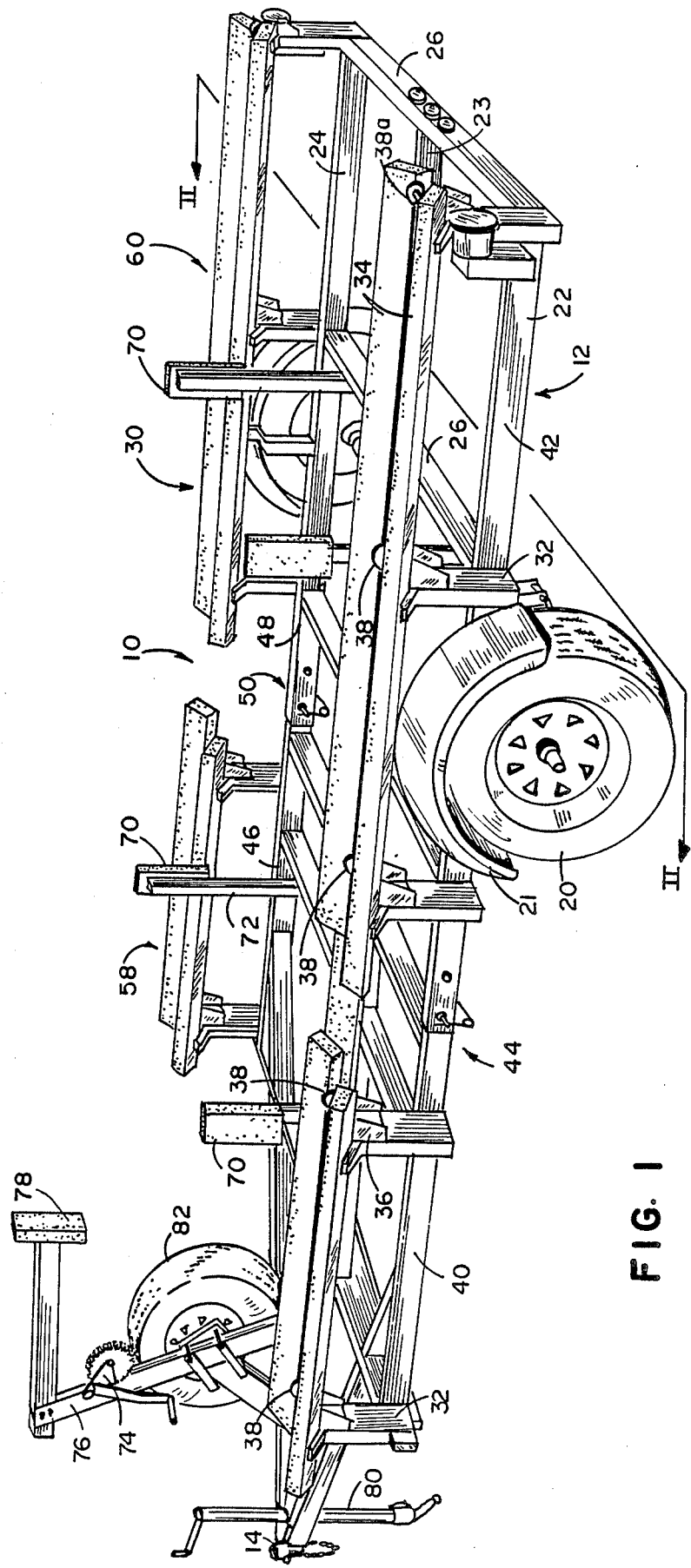
FIG. 1 is a perspective view of a pontoon trailer according to the invention.

A winch 74 (FIG. 1), which may be manually operated or motorized, is mounted to a forward diagonal member 76. A stop 78 is adjustably supported at an end portion of diagonal member 76 and provides a stationary member for the front of the craft to be drawn against. An optional, vertically retractable storage wheel 80 may be provided to support the front of the trailer 10 in the absence of a prime mover. An optional spare tire 82 may be attached to diagonal member 76.

Figure 3:
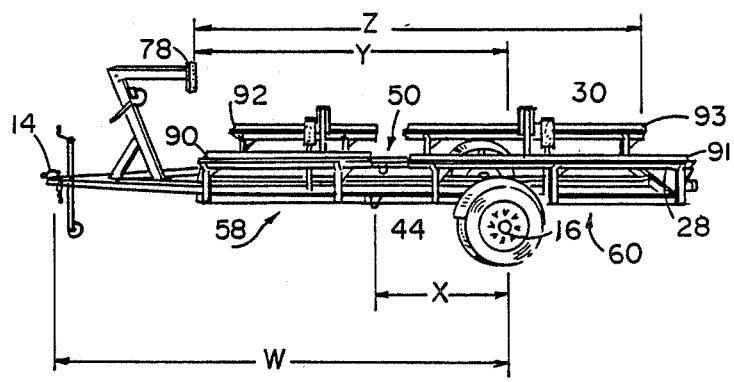
FIG. 3 is a side perspective view of the invention shown in its hauling position.

Referring to FIG. 3, glide member 28 is divided into front and rear glide sections 90 and 91. Glide member 30 is likewise divided into front and rear glide sections 92 and 93. The division between front glide sections 90, 92 and rear glide sections 91, 93 is directly above joints 44, 50. One particular feature of the invention that provides extreme ease in loading and unloading of a pontoon boat is the pivoting of the rear trailer portion that allows the pontoons to longitudinally slide on only the rear glide sections thus reducing friction between the pontoons and the glides. The pontoons will still, however, be fully supported their entire length during transportation.

Figure 4:
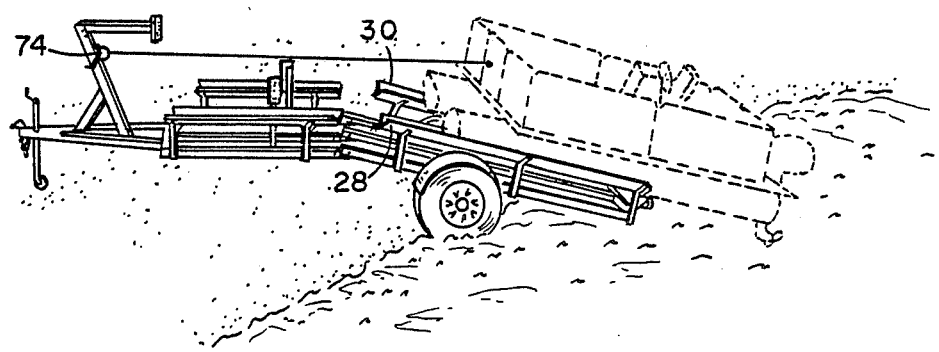
FIG. 4 is a side perspective view of the invention showing a pontoon being loaded or unloaded therefrom.
Figure 5:
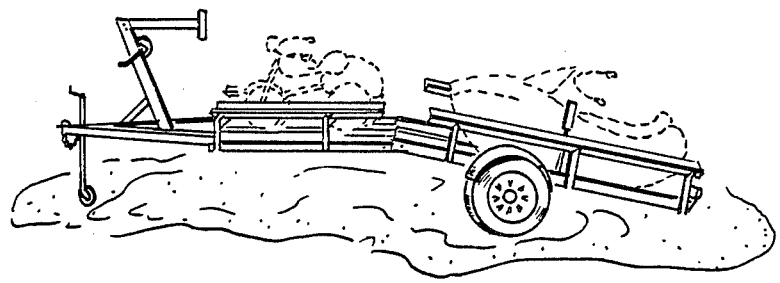
FIG. 5 is a side perspective view of the invention showing it being used as a general utility trailer.

Another important feature is the location of joints 44, 50 and 51 closer to the axle 16 than to the tongue 14 wherein the distance X between joints 44, 50 and axle 16 is less than one-half the distance W between the tongue and the axle. As seen in FIG. 4, the advantage of this structure is that the rear trailer section 60 can be pivoted clockwise as viewed in FIG. 3 so that the rearmost portion of trailer section 60 contacts the ground or water. This is accomplished without unduly pivoting the front trailer section 58 from its horizontal position. As best seen in FIG. 5, this feature enhances the convertibility of the trailer to a general utility trailer because, when the rear trailer section is rotated clockwise to unload the cargo, the front section remains relatively horizontal to prevent disrupting any cargo that is located thereon. In addition, other recreational vehicles can be loaded and unloaded without the need for a separate ramp.

Referring again to FIG. 3, the geometry of trailer 10 lends stability to joints 44, 50 and 51. The portion of glides 28, 30, represented by dimension Y, between forward stop 78 and the axle is greater than one-half the total length Z of the glides. The majority of the weight of a pontoon boat fully loaded on the trailer will, therefore, be ahead of the axle. This not only insures a positive downward thrust on the trailer hitch but also maintains joints 44, 50 positively engaged without producing a shear force on pins 56.

Referring again to FIG. 4, it is seen that with the rear trailer section rotated to a loading position, a pontoon boat can be readily loaded thereon by attaching a line from winch 74 to the craft and winching the craft onto glides 28, 30. The craft will readily align itself with the glides and will therefore not slip off during loading and will be supported over a large area of the pontoon during the entire loading and unloading process. Once the center of gravity of the craft is winched to a position forward the axle of the trailer, the weight of the craft will cause the rear trailer section to rotate counterclockwise into a horizontal position. The pins 56 can then be inserted in apertures 54.

The pontoons will glide easily over pads 34 during loading and unloading and will be assisted in doing this by the rollers 38. The rearwardmost rollers 38a are located adjacent the end of glides 28, 30. This provides an additional feature of the invention of allowing the cable of winch 74 to be directed around one roller 38a in order to exert a rearwardly directed force. Thus, it can be seen that the winch can be useful in unloading the pontoon from the trailer by looping the cable over a roller 38a, attaching it to a portion of the pontoon and retracting the cable.

When fully loaded, the pontoon will be supported in three points along its perimeter on pads 34 and rollers 38. Lateral support members 70 can be used to provide a fourth support point, providing lateral support to maintain the pontoon on the trailer without additional rigging.

If it be desired to utilize the pontoon trailer 10 as a general utility trailer, braces 72 can be removed an a flat bed installed on the frame between the glides. As seen in FIG. 5, the trailer can be converted so as to carry multiple recreational vehicles such as snowmobiles. The vehicles can be loaded and unloaded without the need for a separate ramp and without disrupting the vehicle on the front trailer portion.

Changes and modifications in the specifically described embodiments can be carried out without departing from the scope of the invention, which is intended to be limited only by the scope of the appended claims.

The embodiments of the invention in which an exclusive property or privilege is claimed are defined as follows.

1. A trailer for transporting a multiple-hull craft of the type having at least two laterally spaced apart hulls, said trailer comprising:
   a frame having a front portion and a rear portion, with pivot means for pivotally interconnecting the same;
   first and second ground engaging wheels rotatably connected with opposite sides of the rear portion of said frame and supporting the same;
   first and second glides extending along opposite sides of said frame; each of said glides longitudinally elongated and having a lateral cross-sectional configuration having means including a plurality of circumferentially spaced support points for abuttingly supporting substantially the entire length of one hull of a craft along the length of each said glide; said glides each having a front portion supported on the front portion of said frame, and a rear portion supported on the rear portion of said frame, and including means for permitting mutual rotation therebetween;

a latch selectively interconnecting the front and rear portions of said frame, having a locked position wherein the front and rear portions of each of said glides are retained in a substantially colinear relationship, and an unlocked position wherein the rear portions of each of said glides can pivot with respect to the front portions of said glides to facilitate loading and unloading.

2. The trailer in claim 1 further having a tongue on said front portion for interconnecting to a prime mover and wherein said pivot means is located closer to said wheels than to said tongue.

3. The trailer in claim 1 wherein said front portion includes a longitudinally extending side member section having a rear end and said rear portion includes a longitudinally extending said member section having a front end and wherein said latch comprises said front and rear ends and means for abuttingly overlapping when said side member sections are colinear.

4. The trailer in claim 1 further having apertures in said front and rear portions that are aligned when said side member sections are colinear and said latch means further comprises a pin selectively through said apertures.

5. The trailer in claim 1 in which each of said glides includes a pair of sloping sides generally forming a V-shape and antifriction means in the bight of said V along the length of said glide for reducing friction between said sides on a craft hull that is being longitudinally moved along said sides.

6. The trailer in claim 5 wherein said antifriction means comprise rollers spaced along each of said glides.

7. A trailer for transporting a multiple-hull craft having at least two laterally s paced hulls mounted to a deck by mounting means said trailer comprising:

a frame;
said frame having a pair of laterally spaced, longitudinally extending side members and cross means for rigidly connecting said side members together;
first and second ground engaging wheels rotatably connected with opposite sides of said frame laterally outside said frame; and
first and second glide members, each glide member above and generally laterally aligned with one of said side members; each of said glide members longitudinally elongated and having a lateral cross-sectional configuration having means including a plurality of circumferentially spaced support points for abuttingly supporting substantially the entire length of one hull of a craft along the length of each said glide member and laterally spaced apart the same as the hulls of a craft, each said glide member having a front portion and a rear portion and means for permitting mutual rotation therebetween about a lateral axis to facilitate loading and unloading of a craft on said glide members;
whereby said glide members will be laterally within the lateral extent of said wheels providing stability to a craft being transported on said trailer.

8. The trailer in claim 7 further having lateral support means for preventing lateral movement of hulls in said glide members.

9. The trailer in claim 8 wherein said lateral support means comprises a plurality of vertically extending support members positioned laterally inwardly of said glide members.

10. The trailer in claim 9 wherein said vertically extending support members are removably attached to said cross means.

11. The trailer in claim 7 in which each said glide member includes a pair of sloping sides generally forming a V-shape and antifriction means in the bight of said V along the length of said glide for reducing friction between said sides on a craft hull that is being longitudinally moved along said sides.

12. The trailer in claim 11 wherein said antifriction means comprise rollers spaced along each of said glide members.

13. The trailer in claim 7 in which said frame has a front portion and a rear portion with pivot means for pivotally connecting said frame portions and in which said glide member front portions are supported on said frame front portion and said glide member rear portions are supported on said frame rear portion.

14. The trailer in claim 7 further having a forwardly positioned stop for biasing a craft against forward movement during transportation.

15. A trailer for transporting a multiple-hull craft having a plurality of spaced apart hulls, said trailer comprising:

a frame;
a plurality of elongated glide members attached to said frame and spaced apart the same as the hulls of a craft;
each of said glide members having a pair of sloping sides generally forming a V-shape and extending substantially the entire length of said frame, each of said glide members further having antifriction means in the bight of said V along the length of said glide member for reducing the friction between said sides and a craft hull that is being longitudinally moved along said sides; and
said sides having upwardly facing surfaces covered with a fabric and positioned with respect to said antifriction means such that said sides and said antifriction means will contact a craft hull along its entire length to provide support to substantially the entire length of a craft hull at three points circumferentially spaced around the hull as viewed in cross section.

16. The trailer in clain 15 wherein said fabric is carpet.

17. The trailer in claim 15 wherein each of said glide members is divided into two glide sections, one said glide section rotatable about a lateral axis to facilitate the loading of a craft onto said trailer.

18. The trailer in claim 15 wherein said antifriction means comprise rollers spaced along each of said glide members.

19. The trailer in claim 18 wherein said rollers are made from wood.

20. The trailer in claim 18 further having a winch to facilitate the loading of a craft onto said trailer.

21. The trailer in claim 20 wherein one said roller is located at a rearward end of said glide member whereby the cable from said winch around said roller will be capable of providing a rearward force to facilitate the unloading of a craft from said trailer.

22. A trailer for transporting a pontoon craft having a pair of spaced apart pontoons mounted to a deck by mounting means, said trailer comprising:
   a frame;
   said frame having a tongue defining a front, a pair of laterally spaced, longitudinally extending side members and cross means for rigidly connecting said side members;
   an axle connected to said frame transverse to and extending beyond said side members;
   a pair of wheels on said axle, said wheels laterally outside said frame;
   first and second elongated glide members, each glide member above and generally laterally aligned with one said side member;
   each said glide member having a pair of sloping sides generally forming a V-shape;
   said sides extending substantially the entire length of said frame and having upwardly facing surfaces covered with a fabric;
   each said glide member further having antifriction means in the bight of said V along the length of said glide member for reducing the friction between said sides and a craft hull that is being longitudinally moved along said sides; and
   said sides and said antifriction means supporting substantially the entire length of one hull of a craft along the length of each said glide member.

23. The trailer in claim 22 further having lateral support means for preventing lateral movement of pontoons in said glide members.

24. The trailer in claim 23 wherein said lateral support means are removable to convert said trailer to a multi-use trailer.

25. The trailer in claim 22 wherein each said glide member is divided into front an rear glide sections, one said glide section rotatable about a lateral axis to facilitate the loading of a craft onto said trailer.

26. The trailer in claim 25 wherein said side members each comprising a front and rear section and said trailer further having joint means for pivotally connecting said front and rear members together and latch means selectively operable for maintaining said side member sections colinear in one mode and for allowing said member sections to pivot with respect to each other in another mode and further wherein said front and rear glide sections are attached to respective said front and rear side member sections.

27. The trailer in claim 26 wherein said joint means is forward said axle and located closer to said axle than to said tongue.

* * * * *

UNITED STATES PATENT AND TRADEMARK OFFICE
CERTIFICATE OF CORRECTION

PATENT NO. : 4,801,153
DATED : January 31, 1989
INVENTOR(S) : Parks B. Wilson

It is certified that error appears in the above-identified patent and that said Letters Patent is hereby corrected as shown below:

Column 2, line 51;

"bove" should be ---above---;

Column 4, line 42;

"an" should be ---and---;

Column 5, Claim 2, Line 18;

"interconnecting" should be ---interconnection---;

Column 5, Claim 7, Line 43;

"s paced" should be ---spaced---.

Signed and Sealed this

Nineteenth Day of December, 1989

*Attest:*

JEFFREY M. SAMUELS

*Attesting Officer*    *Acting Commissioner of Patents and Trademarks*